April 9, 1929.  J. A. MILLIKEN  1,708,279

THEFT ALARM DEVICE

Filed Jan. 17, 1928  2 Sheets-Sheet 1

Inventor
John A. Milliken
By Jno. B. Hodges
Attorney

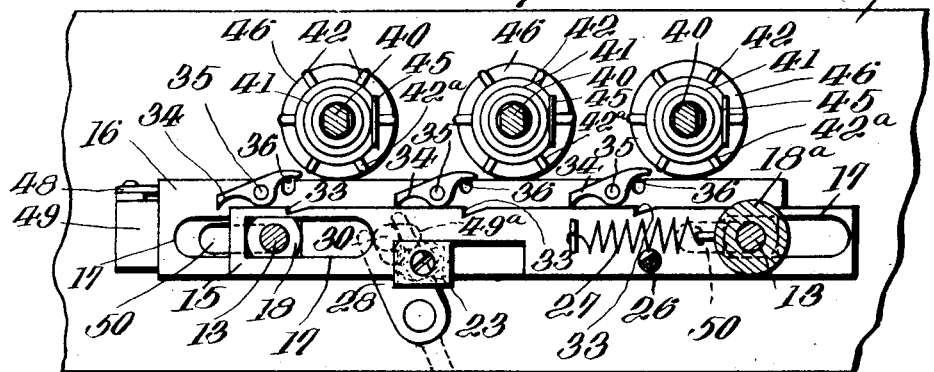
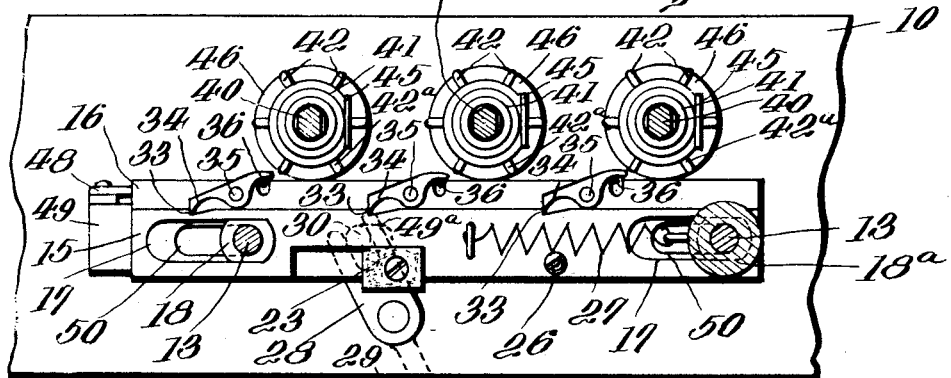
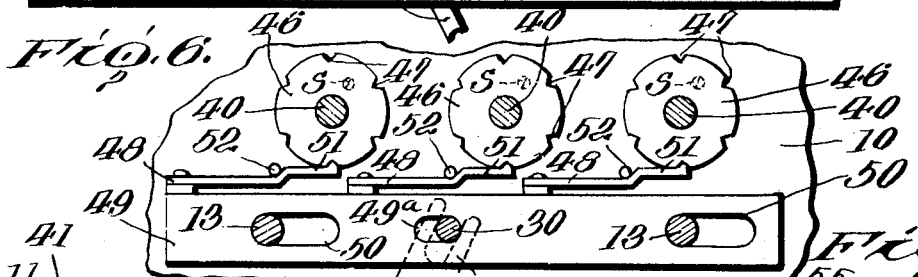
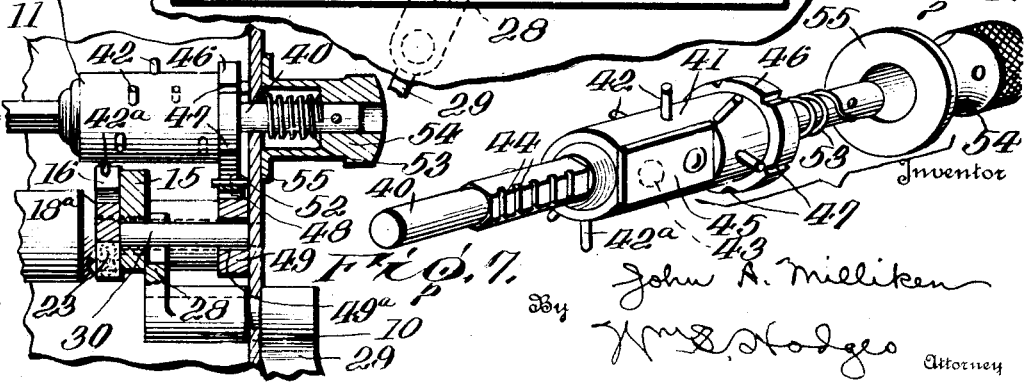

Patented Apr. 9, 1929.

1,708,279

UNITED STATES PATENT OFFICE.

JOHN A. MILLIKEN, OF AMBLER, PENNSYLVANIA.

THEFT-ALARM DEVICE.

Application filed January 17, 1928. Serial No. 247,421.

This invention is a device for use on motor vehicles and the like, by means of which an alarm will be sounded should unauthorized attempts be made to operate the vehicle.

One of the objects of the invention is to provide a device of simple construction, associated with the ignition switch or some other movable control element of a motor vehicle, which will be capable of energizing an electric alarm circuit should said movable element be actuated by unauthorized persons. A further object is to provide a device of the character mentioned in which the parts may be placed in a predetermined relation in order to control an alarm signal, and so constructed that the predetermined setting may be varied through quite a wide range of adjustments. A further object is to provide a device which will insure maximum theft protection without the use of locks, by providing means whereby when the device is once set, the movable control element may be moved in the usual way, to the position necessary to insure propulsion of the vehicle, said means being so constructed that when said control element is moved to inoperative position, the parts will be adjusted to positions which will cause an alarm to be sounded, should there be a further unauthorized attempt to drive the vehicle.

The invention will be hereinafter fully set forth and particularly pointed out in the claims.

In the accompanying drawings:—

Figure 1:
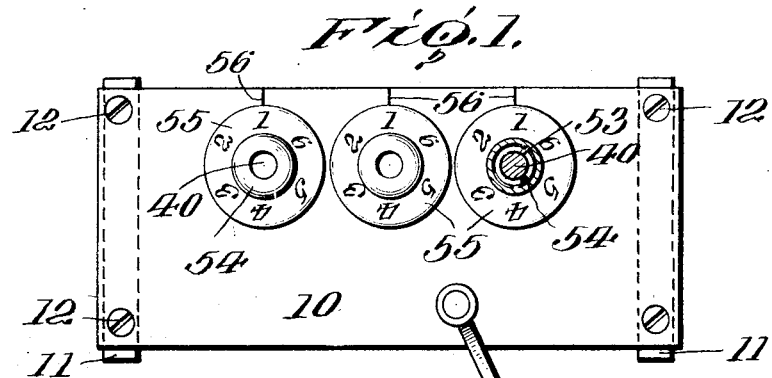
Figure 2:
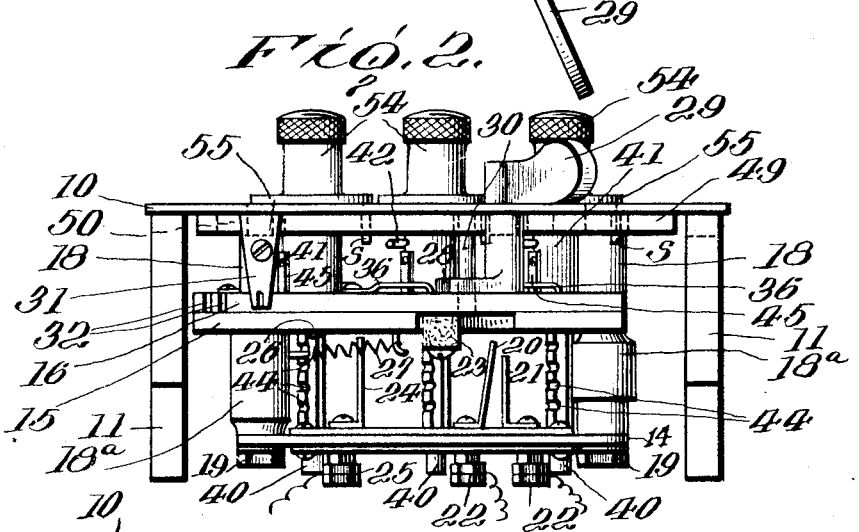
Figure 3:
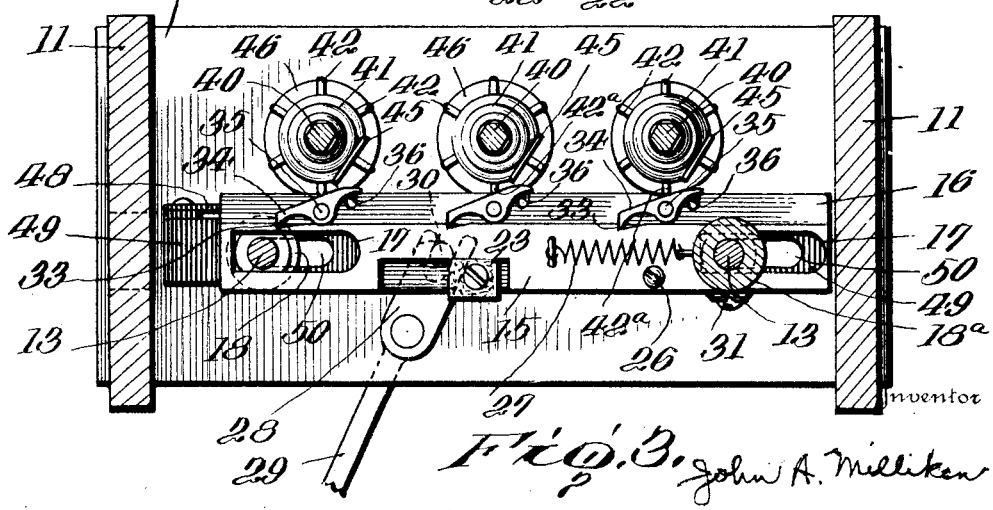

Figure 1 is a front elevation of a signal control device constructed in accordance with the invention. Figure 2 is a bottom plan view. Figure 3 is a longitudinal sectional view. Figures 4 and 5 are detail sectional views illustrating various positions of the circuit control members. Figure 6 is a detail view illustrating the dial-engaging pawls. Figure 7 is a detail sectional view illustrating the dial operating mechanism. Figure 8 is a detail perspective view illustrating one of the dial shafts.

Referring to the drawings, 10 designates a face plate which is secured at its ends to side bars 11, in suitable manner, as by screws 12. Extending rearwardly from said face plate 10 are support rods 13, on the ends of which are mounted the fixed contact plate 14. Slidably mounted upon the support rods 13 are a contact carrier slide 15 and an actuator slide 16, said slides being provided with longitudinal slots 17 through which the members 13 are passed, so as to permit free longitudinal movement. Spacer sleeves 18 serve to maintain the slides in spaced relation with respect to the face plate 10, and similar sleeves 18$^a$ serve to maintain a spaced relation between said slides and the contact plate 14. The outer ends of the rods 13 are preferably screw threaded so as to be engaged by nuts 19, which may be easily removed to permit of ready disengagement of the parts.

Secured to the fixed contact plate 14 are two contacts 20, 21, provided with binding posts 22, by means of which they may be connected with a suitable source of electrical energy. Said contacts are brought together to close the circuit, by means of a block 23 of insulating material, secured to the rear face of the actuator slide 16, a recess being formed in the contact carrier slide 15, to provide the necessary clearance when the slide 16 is operated independently of the slide 15. A fixed alarm contact 24 is also secured to the contact member 14, and provided with a binding post 25, by means of which it is connected with the horn circuit, or any other alarm circuit. The contact 24 cooperates with a complemental contact screw or lug 26, carried by the carrier slide 15, said contact 26 being grounded through the adjacent metal parts. The plate 15 is maintained in a predetermined normal position by means of a spring 27, one end of which is connected with the slide 15 and the other end anchored to one of the sleeves 18$^a$, or to any other suitable stationary part.

The slide 16 is reciprocated longitudinally by means of a yoke 28 pivoted to the face plate 10, and provided with a handle 29, which is located on the outside of the face plate 10 so that it may be conveniently reached. Said yoke engages a pin 30 on the front of the slide 16, and accidental movement of said slide in either direction is prevented by a locking spring 31, which engages notches 32 in the under-edge of said slide. The upper edge of the slide 15 is provided with a plurality of shoulders 33, positioned to be engaged by the toe ends of a plurality of pawls 34, which are pivotally mounted at 35 upon the rear face of the slide 16 in positions to engage said shoulders. Springs 36 are positioned to engage the other ends of said pawls so as to normally maintain them in positions to engage the shoulders 33. It is to be understood that although three of such pawls 34 are illustrated, the number may be greater or less without departing from the spirit of the invention, the three pawls being selected for illustrative purposes only.

Rotatably mounted in the face plate 10 are control shafts 40, there being one of such shafts for each of the pawls 34. Slidably mounted upon each shaft 40, and also rotatable therewith is a barrel 41 which is provided with a plurality of radially projecting pins 42, six being shown for purposes of illustration, which are arranged helically around the barrel. Said barrel is longitudinally adjustable along the shaft 40, and may be held in any desired position by means of a ball-like pawl 43, positioned to be held in engagement with any one of a series of notches 44, by means of a spring plate 45. The number of notches 44 must correspond to the number of pins 42. Mounted on each shaft 40, near the front end thereof is a ratchet wheel 46. Each of said ratchet wheels is provided with a plurality of notches or the like 47, the number of which corresponds with the number of pins 42 carried by the shaft on which it is mounted. Said ratchet wheels are normally held against rotation by pawls 48 carried by a slide 49, which are mounted on the rods 13 immediately back of the face plate 10, slots 50 being provided in said slide to furnish the necessary clearance. Said slide 49 is operated by the cross rod 30, so as to be moved with the slide 16, by lever 29, a slot 49ª being provided in slide 49 to permit of a limited movement of slide 16 before any movement is imparted to slide 49. It is preferred to construct the pawls 48 of spring-like material and to anchor them in such manner that they normally maintain engagement with the peripheries of the ratchet wheels 46.

Each pawl is provided with an offset portion 51 positioned to be moved into engagement with a fixed pin 52 when the slide 49 is moved to the left as viewed in Figure 6, so as to disengage the pawls from the ratchet wheels. Movement of the slide and pawls in the opposite direction again permits the pawls to engage the ratchet disks 46.

The shafts 40 are maintained in a normal predetermined position against stops S by means of helical springs 53, one end of each spring being anchored to the face plate 10 and the other end to the shaft. Said springs are enclosed within the hubs 54 of dials 55, said dials containing numbered scale marks corresponding to the number of pins 42 and positioned to register with fixed scale marks 56 on the face plate 10. The markings of the scales on dials 55 correspond to the respective positions of said pins 42 along the respective barrels 41.

In practice, the barrels 41 are adjusted longitudinally of the shafts 40 so that each pawl 43 will engage any arbitrarily selected notch 44. As a result of this adjustment, one of the pins 42 (which for identification will be marked 42ª), will occupy a position longitudinally of the barrel 41 that corresponds with the position of the selected notch 44, and will also occupy a position in the same vertical plane as one of the pawls 35. The shaft 40 is then rotated so that the number on the dial 55 which corresponds to the location of the selected notch 44 is brought opposite the mark 56 on the face plate 10. When this is done, the pins 42ª will have been moved to the positions illustrated in Figure 3. In the drawings, the barrels of the three shafts 40 are shown as engaged with the first notch 44, and therefore the first pins 42 nearest the face plate are the ones which become the control pins 42ª of the device. To set the device under these conditions, the ignition switch is first shut off i. e. in the position shown in Figure 1 and the three dials 55 are rotated so that the numeral 1 on each dial registers with the scale mark 56 as clearly shown in Figure 1, and the ratchet disks 46 are engaged by pawls 48 at notches 47 which correspond to the positions of said scale marks, as illustrated in Figure 6. In other words, the owner of the machine, knowing the combination for which he has set the barrels, must, before starting his machine, place the dials 55 and disks 46 in the positions required by the combination, that is with the figures on the dials registering with the scale marks 56 and the pawls 48 engaging corresponding notches. It will be understood of course, that the setting of the disks 55 places a tension on the springs 53 tending to reversely rotate the shafts 40, but said shafts are prevented from rotating by reason of the engagement of pawls 48 with notches 47. It will be assumed for illustration, that the combination is 111 which means, as before stated, that the first pin 42 i. e. pin 42ª of each shaft 40 will control the operation of the respective pawls 35. The operator when he desires to start the machine, moves the handle 29 of the ignition switch to the left as viewed in Figure 1, or to the right as viewed in Figures 3, 4 and 5. The effect of this movement is to cause the slide 16 to be moved to the left as viewed in Figures 3, 4 and 5, and by reason of the pawls 35 being in engagement with the shoulders 33, the movement of the slide 16 will also impart movement to the slide 15, thereby moving the contact 26 toward the contact 25. However, as the upwardly projected ends 37 of the pawls 35 pass beneath the pins 42ª, which lie directly over them, the said pawls are rocked against the tension of their springs 36, so as to release the slide 15 before the contacts are engaged, whereupon the spring 27 will return the slide 15 to its predetermined normal position. At the same time movement of the slide 16 causes the block 23 to engage the contact 20 and move it into engagement with the contact 21, so that the ignition circuit is closed and maintained until further movement of said slide 16, and the engine is operated in the usual way. Before the described movement of the slides 15 and 16, is completed, the slide 49 is also moved to the left as viewed in Figure 6, thereby disengaging the pawls 48 from disks 46, and permitting the shafts 40 to be reversely rotated to their predetermined normal positions by springs 53, so that the pin 42ª will be out of the path of future movements of pawls 35 until the combination is reset. The parts will now occupy the positions illustrated in said Figure 4.

It will be obvious from an inspection of Figure 4 that when the ignition switch is moved to again break the ignition circuit, the slide 16 will then be moved to the right as viewed in said figure, whereupon the pawls 35 will again engage the shoulders 33. Thereafter, should any unauthorized person attempt to operate the motor vehicle by turning on the ignition switch to the position illustrated in Figure 5, the pawls 35 will engage the shoulders 34 and carry the slide 15 to a position that will bring the contact 26 into engagement with the contact 24, and close the circuit to the horn or other signal. The result will be a continuous sounding of the horn until the ignition switch is turned off. And this condition will be maintained every time the ignition switch is moved to close the ignition circuit, until the shafts 40 are reset to their original combination positions, which must be done each time the vehicle is to be operated after the ignition switch is turned off, in order to prevent the sounding of the signal.

The advantages of the invention will be readily apparent to those skilled in the art to which it belongs. It will be readily understood that a very simple and inexpensive device is provided, which may be applied to the control system of a motor vehicle, and that the same is so constructed that an instant alarm is given should any one attempt to operate the ignition switch or other control element to which the invention may be applied, without first resetting the parts. In view of this, a car may be left unlocked because unauthorized attempts to operate it will be instantly proclaimed. It will also be understood that by reasons of the helical arrangement of the pins 42 and the adjustable relation of the barrel 41 along the shaft 40, the combinations may be varied at will and with little or no difficulty.

It is to be understood that although the invention is illustrated and described as applied to an ignition switch, it is not limited in this respect. In other words, it is equally applicable to any other movable control element of a motor vehicle.

Having thus explained the nature of the invention and described an operative manner of constructing and using the same, although without attempting to set forth all of the forms in which it may be made, or all of the forms of its use, what is claimed is:—

1. A theft alarm device comprising a stationary signal contact, a reciprocable carrier member provided with a second complemental signal contact, means for engaging said carrier member and moving it in one direction to bring said contacts together, means for releasing said carrier member from its moving means before said contacts engage, means for returning the released carrier member to its predetermined normal position, and means for rendering said releasing means inoperative, so that a subsequent movement imparted to the contact carrier in the initial direction will be continued until said contacts are brought into engagement with each other.

2. A theft alarm device comprising a stationary signal contact, a reciprocably mounted carrier member provided with a second complemental signal contact, a reciprocably mounted actuator member, means for moving said actuator member in either direction, connecting means by which movement of the actuator member in one direction will impart movement to the carrier member in the same direction to bring said signal contacts together, control means for automatically releasing said carrier member before the contacts are brought into engagement, means for returning the carrier member to its original position when released, and means operable in timed sequence with the release of said carrier member for rendering said releasing means inoperative so that the later movement of the contact carrier in the initial direction will move the carrier a sufficient distance to bring said contacts into engagement.

3. A theft alarm device comprising a stationary signal contact, a contact carrier provided with a complemental contact, an actuator slide having one face in engagement with a face of said contact carrier, means for reciprocating said actuator slide, connecting means carried by the actuator slide and positioned to engage the contact carrier, so that movement imparted to said actuator slide in one direction will impart corresponding movement to the contact carrier member in the same direction to bring said contacts together, control means for automatically disengaging said connecting means before said contacts are engaged, means for returning the contact carrier to its original position when released, and means for rendering said releasing means inoperative subsequent to the release of said contact carrier, so that a subsequent movement of the contact carrier in the initial direction will be continued until said contacts are brought into engagement.

4. A theft alarm device comprising a stationary signal contact, a contact carrier provided with a complemental signal contact, said carrier being also provided with a shoulder, an actuator slide mounted to reciprocate adjacent to the contact carrier, means for reciprocating said actuator slide, a pawl carried by said actuator slide and positioned to engage said shoulder, so that movement imparted to the actuator in one direction will impart corresponding movement to the contact carrier in a direction to bring the contacts together, control means for automatically rocking said pawl to disengage said contact carrier before the contacts are brought into engagement, means for returning the contact carrier to its original position when released, and means for rendering said disengaging means inoperative after the release of the contact carrier, so that upon a subsequent movement of the actuator member in the initial direction the engagement of the pawl with the contact carrier will be maintained until the contacts are brought into engagement.

5. A theft alarm device comprising a stationary signal contact, a reciprocable contact carrier provided with a complemental signal contact, a reciprocable actuator member, means for moving said actuator member in either direction, connecting means by which movement of the actuator member in one direction will impart corresponding movement to the contact carrier in the same direction so as to bring said contacts together, a rotatable control member having means for automatically releasing said contact carrier before said contacts are brought into engagement, means for returning the contact carrier to its original position when released, and means for rotating said control member to an inoperative position in timed relation to the release of the actuator member, so that a subsequent movement of the actuator member in the initial direction will move the contact carrier a distance sufficient to bring said contacts into engagement.

6. A theft alarm device comprising a stationary signal contact, a reciprocable contact carrier provided with a complemental signal contact, a reciprocably mounted actuator member, means for imparting movements to the actuator member in either direction, a connector member carried by the actuator member and constructed to engage and move the contact carrier so as to bring said contacts together, a control member having a pin positioned to engage said connector member and operative during the initial movement of the actuator member to release the contact carrier before said contacts are brought into engagement, means for returning the released contact member to its original position, and means operable in conjunction with said slide for so moving said control member as to place its pin in an inoperative position, so that a subsequent movement of the actuator member in the initial direction will carry the contact carrier far enough to engage the contacts.

7. A theft alarm device comprising a stationary signal contact, a reciprocable contact carrier provided with a complemental contact, means for imparting movement to the contact carrier in a direction tending to bring said contacts together, a rotatable control member provided with a radially disposed pin positioned to be brought into the path of movement of said movement-imparting means by rotative adjustment of said control member, so as to release said contact carrier before engagement of said contacts, means for returning the released contact member to predetermined normal position, and means operating upon said control member to move said pin to an inoperative position in timed relation with the movement of said slide, so that a subsequent movement imparted to the contact carrier in the initial direction will bring said contacts into engagement with each other.

8. A theft alarm device comprising a stationary signal contact, a movable contact carrier provided with a complemental signal contact, a movable actuator member, means for imparting movement to the actuator member in either direction, pivotally mounted connector members carried by the actuator member and arranged to engage said contact member, so that movement of the actuator member in one direction will move the contact member in a direction tending to bring said contacts together, a plurality of rotatable shafts, a barrel mounted on each of said shafts and provided with a plurality of helically arranged pins, said barrel being longitudinally mounted upon said shaft so that any one of said pins may be brought into the path of movement of said pawl by rotation of the shaft, so that the pins will be positioned to engage said connector members to release the contact slide before the contacts are brought into engagement, means tending to rotate said shafts to a predetermined normal position, means normally preventing such rotation, and means operable in timed relation with the movements of the slide to release said shafts, so that during a subsequent movement of the actuator member in the initial direction the pins will be outside of the paths of movement of said connector members and the contact carrier will be carried far enough to bring the contacts into engagement with each other.

9. A theft alarm device comprising a stationary signal contact, a contact carrier having a complemental signal contact and provided with a plurality of shoulders, an actuator slide, means for reciprocating said slide, spring pressed pawls pivotally mounted upon said actuator slide and positioned to engage said notches, so that movement of the actuator member in one direction will impart corresponding movement to the contact carrier in the same direction to bring said contacts into engagement, a plurality of shafts one for each pawl, barrels mounted on the said shafts, each of said barrels being provided with a plurality of helically arranged pins, said barrel being longitudinally adjustable upon said shaft so as to bring either of its pins in the same vertical plane as one of said pawls, so that said shafts may be rotatively adjusted to bring the pins in positions to rock said pawls so as to release said contact carrier before the contacts are brought into engagement, means for returning the released contact slide to its normal position, means tending to rotate said shafts to predetermined normal positions, means normally preventing such rotation, and means operable in timed relation with the movements of said slide to release said shafts, so that during a subsequent movement of the actuator member in the initial direction the pawls will not be disturbed and the contact carrier will be moved in the same direction until the contacts engage with each other.

10. A theft alarm device comprising a stationary signal contact, a contact carrier provided with a complemental signal contact, an actuator member, pawls pivotally mounted upon said actuator member and provided with upturned ends, said pawls being constructed to engage said contact carrier, so that movement imparted to the actuator member in one direction will impart corresponding movement to the contact carrier to bring the contacts together, a plurality of shafts one for each pawl, a barrel mounted on each shaft and provided with a plurality of helically disposed pins, each of said barrels being adjustable lengthwise of its shaft so that a predetermined pin thereon may be brought into the same vertical plane as one of said pawls, said shafts being rotatably adjusted to bring any selected pin on each barrel into the path of movement of a pawl, so that when movement is imparted to the actuator slide while the pawls are in engagement with the contact slide, said pins will rock the pawls and release said contact slide, means for returning the released contact slide to its original position, means tending to rotate said shafts to predetermined normal positions, means normally preventing such rotation, means operable in timed relation with the movements of the actuator slide to release said shafts, means for maintaining said pawls in normal positions to engage said contact slide, so that a subsequent movement of the actuator member in the initial direction will move the contact carrier far enough to bring the contacts into engagement with each other, and index means on said shafts for indicating the location of the particular pins which are selected to lie in the paths of movement of the pawls.

11. A theft alarm device comprising a stationary signal contact, a slidable contact-carrier provided with a complemental contact, an actuator slide, a spring pressed pawl mounted on said actuator and normally engaging said carrier, so that movement of the actuator in one direct will impart corresponding movement to the carrier, a rotatable shaft provided with one or more pins adapted to engage said pawl, a spring engaging said shaft in a manner to be placed under tension by rotative adjustment of the shaft to bring one of said pins opposite to said pawl, means for holding said shaft in its adjusted position, so that said pin will engage and rock said pawl during movement of the carrier by said actuator before said contacts are brought together, means for returning the contact carrier to a predetermined normal position, and means for releasing said shaft whereupon said spring will rotate it to move the pins out of the path of movement of the pawl, so that during a subsequent movement of the actuator slide in the initial direction the movement of the carrier will be continued until the contacts are brought into engagement.

12. A theft alarm device comprising a stationary signal contact, a slidable contact-carrier provided with a complemental contact, an actuator slide, a spring pressed pawl mounted on said actuator and normally engaging said carrier, so that movement of the actuator in one direction will impart corresponding movement to the carrier, a rotatable shaft provided with one or more pins adapted to engage said pawl, a spring engaging said shaft in a manner to be placed under tension by rotative adjustment of the shaft to bring one of said pins opposite to said pawl, a ratchet disk on said shaft, a spring pressed pawl engaging said ratchet disk to hold said shaft in its adjusted position, so that said pin will engage and rock said pawl during movement of the carrier by said actuator before said contacts are brought together, means for returning the contact carrier to a predetermined normal position, and means for disengaging the last mentioned pawl from said ratchet disk, whereupon said spring will rotate said shaft to move the pins out of the path of movement of the pawl, so that during a subsequent movement of the actuator slide in the initial direction the movement of the carrier will be continued until the contacts are brought into engagement.

13. A theft alarm device comprising a stationary signal contact, a reciprocably mounted carrier member provided with a second signal contact, a reciprocably mounted actuator member, means for moving the actuator member in either direction, connecting means by which movement of the actuator member in one direction will impart movement to the carrier member in the same direction to bring said contacts together, control means for releasing said carrier member before said contacts are brought into engagement, means for returning the carrier member to its original position when released, a controller slide movable with the actuator member, and means governed by movement of the controller slide for rendering said releasing means inoperative, so that a subsequent movement of the actuator member in the initial direction will move the carrier member far enough to bring the contacts into engagement.

14. A theft alarm device comprising a stationary signal contact, a reciprocably mounted carried member provided with a second signal contact, a reciprocably mounted actuator member, means for moving the actuator member in either direction, connecting means by which movement of the actuator member in one direction will impart movement to the carrier member in the same direction to bring said contacts together, a control shaft having means for releasing said carrier member before said contacts are brought into engagement, means for returning said carrier member to its original position, a controller slide movable in timed sequence with respect to the actuator member and provided with means acting to prevent rotation of said shaft, and means operated by movement of the controller slide for releasing said shaft from said rotation-preventing means, so that said shaft will rotate said carrier-releasing means to an inoperative position, whereupon a subsequent movement of the actuator slide in the initial direction will move the carrier member far enough to bring the contacts together.

In testimony whereof I have hereunto set my hand.

JOHN A. MILLIKEN.